United States Patent [19]
Kaufman

[11] 3,769,666
[45] Nov. 6, 1973

[54] SHEARING APPARATUS WITH MEANS TO DETECT CLEARANCE BETWEEN CUTTING BLADES

[75] Inventor: Aaron M. Kaufman, Queens, N.Y.

[73] Assignee: Reliable Machine Works, Inc., Brooklyn, N.Y.

[22] Filed: Jan. 21, 1972

[21] Appl. No.: 219,907

Related U.S. Application Data

[62] Division of Ser. No. 40,609, May 26, 1970, Pat. No. 3,683,468.

[52] U.S. Cl. .............................. 26/15 R, 324/61 R
[51] Int. Cl. ............................................ D06c 13/00
[58] Field of Search ............. 26/15 R, 15 L, 15 FB; 324/61 R, 61 P

[56] References Cited
UNITED STATES PATENTS

| | | | |
|---|---|---|---|
| 469,502 | 2/1892 | Greene | 26/15 R |
| 1,694,865 | 12/1928 | Richardson | 26/15 R |
| 2,389,800 | 11/1945 | Marble | 26/15 R |
| 2,431,841 | 12/1947 | Storm | 324/61 R |
| 2,854,131 | 9/1958 | Murray | 26/68 UX |
| 3,031,617 | 4/1962 | Paquette | 324/61 R |
| 3,465,397 | 4/1969 | Hergert | 26/15 R X |
| 3,641,431 | 2/1972 | Pigage et al. | 324/61 R |

*Primary Examiner*—Robert R. Mackey
*Attorney*—Harold James et al.

[57] ABSTRACT

A shearing apparatus for automatically shearing natural and/or synthetic fibrous material comprises a rotating blade and a fixed blade positioned in a cutting relationship with a minimal clearance space therebetween. Means are provided to accurately measure that clearance space while the apparatus is in operation. Means are also provided to accurately adjust the relative position of the cutting blades during the operation of the apparatus thereby to reduce the clearance space to a desired amount.

4 Claims, 13 Drawing Figures

SHEARING APPARATUS WITH MEANS TO DETECT CLEARANCE BETWEEN CUTTING BLADES

This is a division of application Ser. No. 40,609 filed May 26, 1970, entitled "Shearing Apparatus," now U. S. Pat. No. 3,683,468, granted Aug. 15, 1972.

This invention relates to shearing device, and more specifically to an apparatus which is adapted to shear natural and/or synthetic fibers continuously or intermittently by the rotary motion of a shearing blade.

Generally, a shearing action is accomplished by placing the object to be sheared between two blades so that a single point of contact is simultaneously made between each blade and the object when the object is brought toward the blades. When further pressure is exerted on the object by the blades after contact is made, the surfaces of the object in contact with the blades are compressed until the maximum point of elasticity is reached. Beyond this point, the blades penetrate the surfaces of the object. Continued movement of the blades toward each other develops a force of an intensity sufficient to overcome molecular order within the structure of the object. At that point the part of the thickness of the object which is not yet penetrated by the blades breaks away and the object is said to have been sheared. Normally, the perecentage of the object that is broken away in this manner approximates 30 percent of the total material thickness. This percentage approximation generally applies for all types of material or fibers being sheared.

While the above action of shearing has been described with reference to two moving blades, present devices which are adapted to shear on a wide scale production basis function in essentially the same ay notwithstanding a structure in which only one blade moves and the other blade is fixed. A typical device of this type includes a rotating cylinder, the periphery of which is equipped with a plurality of cutting blades. The fixed blade is commonly referred to as a bedknife and is positioned at a precise location relative to the rotating blades. A flat guide table or plate is positioned near the bedknife and is adapted to carry the material to be sheared toward the bedknife. The end of this table or plate is provided wtih an extemded part over which the material is passed during its movement. This extended part is positioned very close to the bedknife and is effective to spread the fabric so that the fibers to be sheared are projected into an overlapping engagement with the stationary bedknife. The blades on the rotating cylinder then engage these overlapping fibers at a surface thereof opposite to the surface which engages the fixed blade, and shearing of the fibers occurs. Continuous shearing action is accomplished by moving the fibers through the shearing zone at a desired rate of speed while simultaneously rotating the cylinder at a suitable speed relative to the movement of the fabric.

In order to effect a proper shear of the fibers in accordance with the principles above discussed, precise positioning of the various components in the shearing apparatus is essential. Normally there should be virtually no clearance at the shearing zone between the cutting blades to uniformly cut the fibers and thereby establish a fine finish on the fabric. For example, the clearance between fixed and rotating cutting blades in this area should be maintained at some value equal to or less than the molecular breakaway thickness of the material, that is 30 percent or less of the thickness of the fiber for good shearing action. Maintaining such a small clearance between cutting blades has thus far been a major problem in shearing devices of this type. The primary difficulty is that there are many apparatus structural variables which influence this particular clearance setting and must be controlled. Moreover, the fiber thickness is rarely uniform from fabric to fabric or even in a single fabric which is to be sheared. Extra fine fabrics include fibers having a thickness as small as 0.0001 inch. Thus, the clearance should be maintained at a level which essentially is for all practical measuring purposes no clearance at all, and yet there must be no frictional interference between the rotating blade and the fixed blade.

Attempts to overcome the difficulties of maintaining such a slight clearance between working blades have thus for not been satisfactory. In addition to the fiber thickness variation and structural problems another major difficulty has been the general inability to prevent the "flyout" action of the rotating blades on the cylinder. These blades extend several thousandths of an inch outwardly during rotation due to the centrifugal force acting upon them. This must be taken into account when the initial setting of the blades is made. However, the initial setting is made when the blades are at rest, and therefore is merely an estimated position. Adjustment of the cylinder blade while it is rotating is not good practice since damage of the cutting blades is very possible. With many shearing devices such adjustment is not even possible because of the nature of the structure and even if it were possible, there is no successful way to accurately determine whether a suitable adjustment has been made.

Other problems which have a strong influence upon the proper operation of the shearing apparatus have also thus far escaped solution. Among such problems is the fact that the cylinder and is supporting structure is subject to vibrational forces because of the high speed at which the cylinder is rotated. Obviously such vibration is most undesirable and may seriously adversely affect the quality of the finished product. Still another consideration is the specific position of the guide table relative to the cylinder blades. This position is important since it is determinative of the position of the fibers as they enter the shearing zone. Yet just as with the blade position, precise positioning of this component is also difficult to attain, in part because the movement of any of the components is affected by the inherent inaccuracies of the mechanism itself. For example, when the cylinder is moved mechanically to get its blades into a proper position, any calculated degree of movement must necessarily be affected by the backlash in the moving mechanism. However, because of the size and inaccessibility of the movable components movement must be imparted by some driving means. As a result lost motion is incurred and inaccuracies result. When clearances in the order of a few thousandths of an inch and less are required, such incaccuracies are significant in the system and must be avoided.

It is the primary object of this invention, therefore, to provide a shearing apparatus which overcomes all of the aformentioned problems, and which is capable of shearing fibrous materials of various types and sizes with a high degree of quality.

It is another object of this invention to provide a means for monitoring the clearance space between shearing blades in a shearing apparatus while the apparatus is in motion.

It is a further object of this invention to provide a shearing apparatus which is structured so that the positions of the shearing blades may be adjusted relative to each other with a high degree of accuracy even while the apparatus is in motion.

It is still another object of this invention to provide a shearing apparatus which is characterized by a unique construction which enables it to resist vibration during its operation and thereby substantially eliminate the effects of vibrational forces on the shearing action.

It is yet another object of this invention to provide a shearing apparatus which is characterized by a guide table having adjustment means adapted to vary the position of the table in serveral planes.

It is still a further object of this invention to provide a shearing apparatus having an exhaust system which is capable of removing flock from the shearing zone efficiently and quickly.

The shearing apparatus of the invention solves the aforementioned problems and satisfies the above objects by a plurality of improvements in a basic shearing apparatus comprising a rotating blade and a fixed blade. One such improvement permits the apparatus to be monitored for clearance space between the blades while the apparatus is in operation and enables an adjustment of the shearing components to be made base upon the monitoring information received while the apparatus is in operation. To this end means for measuring the distance between the edge of the blade on the rotating cylinder and the edge of the fixed cutting blade comprise an electrical power source, preferably a voltage source of a small nominal voltage, which is connected at one output terminal to the bedknife and at the other output terminal to the bearings which carry the cylinder. The cylinder blades are electrically connected to the bearings. An insulating material is used to electrically isolate the cylinder blades from the bedknife. An indicating means such as a light, a voltmeter or the like is connected in the circuit. When a voltage from the source is applied, the dielectric between bedknife and cylinder blade will be broken down provided that the clearance is small enough or such action to occur. When the breakdown of the dielectric does occur it is indicated at the light or meter in the form of a current flow, the intensity of which is directly proportional to the degree of breakdown of the dielectric. Thus, if the blades are actually in contact, a high current reading will be registered. On the other hand, if the clearance between blades it too great, no current or a very minimal current will be measured. By a proper correlation of the voltage and current, the measuring instrument may be calibrated to indicate the clearance in dimensions as little as a few then thousandths of an inch. Such an indication is readily obtained when the cylinder blades are rotating, since connection of the power source need not be made directly to the rotating blades to obtain the desired results. Therefore the clearance space between blades in the shearing zone may be continuously and accurately monitored during the operation of the apparatus.

One section of the shearing apparatus of the invention is constructed as a unit to resist vibrational forces during the rotation of the cylinder and to facilitate the manufacture, assembly and transportation of the system. That section comprises the rotatable cylinder and blades thereon, a pair of bearings, one at each end of the cylinder shaft, bearing support blocks on which the bearings are mounted, and specifically configured supporting members on which the bearing blocks are positioned. The supporting members are in turn affixed to the supporting plate which extends across the shearing apparatus for the full length of the cylinder. A bedknife holder is permanently and rigidly affixed to that plate. The bedknife is adjustably secured to the bedknife holder at a predetermined angle relative to the cylinder. Yet another supporting plate is rigidly affixed to the first plate, and extends upwardly at an angle thereto to connect with the bedknife holder at the rear portion thereof. The resulting structure of bedknife and support plates resembles a triangle in cross section and it is this structure which imparts an exceptional degree of rigidity to the overall assembly.

The specially configured supporting members which are positioned beneath the bearing blocks are in the form of a block H. The upper part of each H block engages the lower projecting part of the bearing blocks. This engagement is effective to prevent lateral movement of the cylinder. However, forward and rearward movement of the cylinder toward and away from the bedknife blade is accomplished by the linear movement of the bearing support blocks on the H blocks. This movement may be provided by a manual or automatic rotation of a driving shaft which is operatively connected to the cylinder bearings. A special locking mechanism is connected between the H support blocks and the bearing support blocks and is effective to drive these blocks together and hold them in tight engagement after the desired movement of the cylinder is carried out.

A special feature of the shearing apparatus is the connecting mechanism between the driving shaft and the cylinder bearings which enables the cylinder to be moved an accurate amount in response to the motion of that Shaft without lost motion of any kind. This mechanism comprises a specially configured member operatively threadably engaging and substantially enclosing the shaft. This member is partially split, preferably at its central portion, and is provided with adjusting means such as screws which pass through one split section. Tightening or loosening these screws adjusts the degree of engagement pressure between the member and the threaded shaft, that pressure being capable of adjustment to the extent necessary to eliminate backlash between the shaft and the threaded member. The member is rigidly affixed to the cylinder bearings which in turn engage the cylinder shaft. Upon the movement of the threaded shaft, the member is moved linearly along the shaft and that linear motion is transmitted directly to the bearings and thus the cylinder. The degree of cylinder movement may be accurately calculated in terms of shaft revolutions since lost motion is eliminated.

Additional parts of the shearing apparatus of the invention include improvements which are also designed to provide a control of those variable factors which influence the shearing operation. One component which plays an important role in the operation of the apparatus is the guide plate or table which is used to guide into the shearing zone the material to be cut, and more specifically to spread that material so that the fibers approach this shearing zone in an uncluttered condition. It is imperative that this table, which is commonly referred to as a nose box or nose piece, be positioned so that the desired length of fiber is cut at an angle which is suitable to obtain good shearing action. In the present invention several improvements have been incorporated in the nose piece structure to enable it to be positioned in several planes relative to the plane of the shearing zone. Means are provided to move the nose piece toward or away from the cutting zone an exact amount. In addition other means are provided to move the nose piece upwardly or downwardly relative to the cutting zone an amount which also may be accurately determined. In the preferred embodiment, the forward moving means comprises first and second tracks attached to the frame of the apparatus on either side of the nose piece. Front and rear rollers are fixed to the nose piece and are adapted to roll in the tracks on the frame. The rollers are driven by a threaded shaft and gear arrangement through an anti-backlash member similar to that above described with reference to cylinder movement. The motion may occur by the manual or automatic manipulation of the shaft.

In the preferred embodiment, the nose piece is constructed with an upper and a lower section. These sections are hinged at the rear part of the nose piece. An eccentric cam is positioned between upper and lower sections and engages the underside of the upper section. The cam is effective when driven in a rotary direction to separate the sections about the hinged connection at the rear portion. The driving force to the cam is also provided by a combination of a threaded shaft and a gear connected to the shaft and working the cam. Since it has been determined that optimum shearing action occurs when the nose piece center line is approximately ⅛ inch above the center line of the rotating cylinder, that exact position is readily obtained by the vertical movement of the upper section of the nose piece by the cam mechanism. For this purpose a fixed scale may be provided on the frame of the apparatus itself in a position to accurately indicate when the nose piece has arrived at its proper operating level.

Another improvement in the shearing apparatus of the invention which enables the apparatus to function more efficiently is the incorporation of a novel flock exhaust system. The system is constructed so as to create a negative pressure zone as close to the shearing zone as possible. In addition, a high velocity exhaust zone which connects with the lower portion of the rotating cylinder is also provided by a special arrangement of exhaust manifolds. This high velocity zone enables better control and exhaust of the flock which results from fiber shearing. Heretofore, the flock became caught in the turbulence generated by the rotating cylinder, and clogged the cutting blades to the extent that they were often rendered unusable. In the present apparatus, the exhaust system is effective to eliminate substantially all flock from the apparatus quickly and efficiently. In addition, the fibers of the fabric to be sheared are passed into the shearing zone at a controlled angle by the suction force of the negative pressure zone. This helps to rigidity the fibers so that they may more easily be sheared.

To the accomplishment of the above, and to such other objects as may hereinafter appear, the present invention relates to a shearing apparatus as defined in the appended claims, and as described in the accompanying drawings in which:

Figure 1:
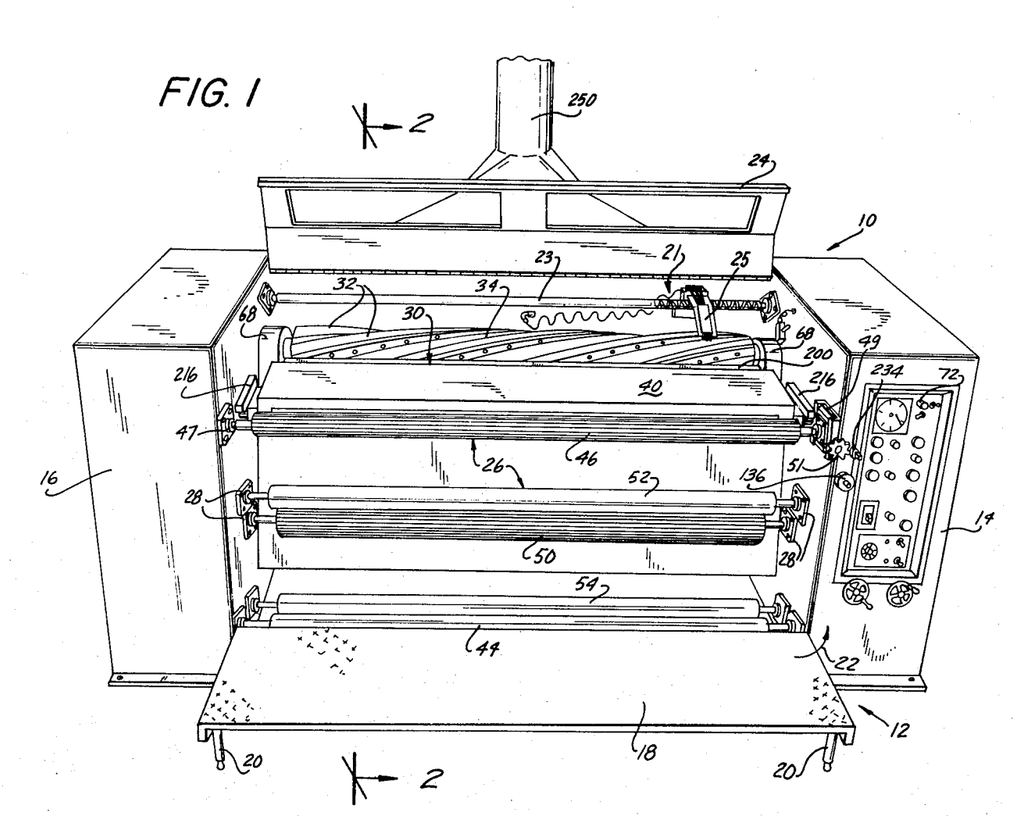
FIG. 1 is perspective view of a shearing apparatus typical of the invention.
Figure 2:
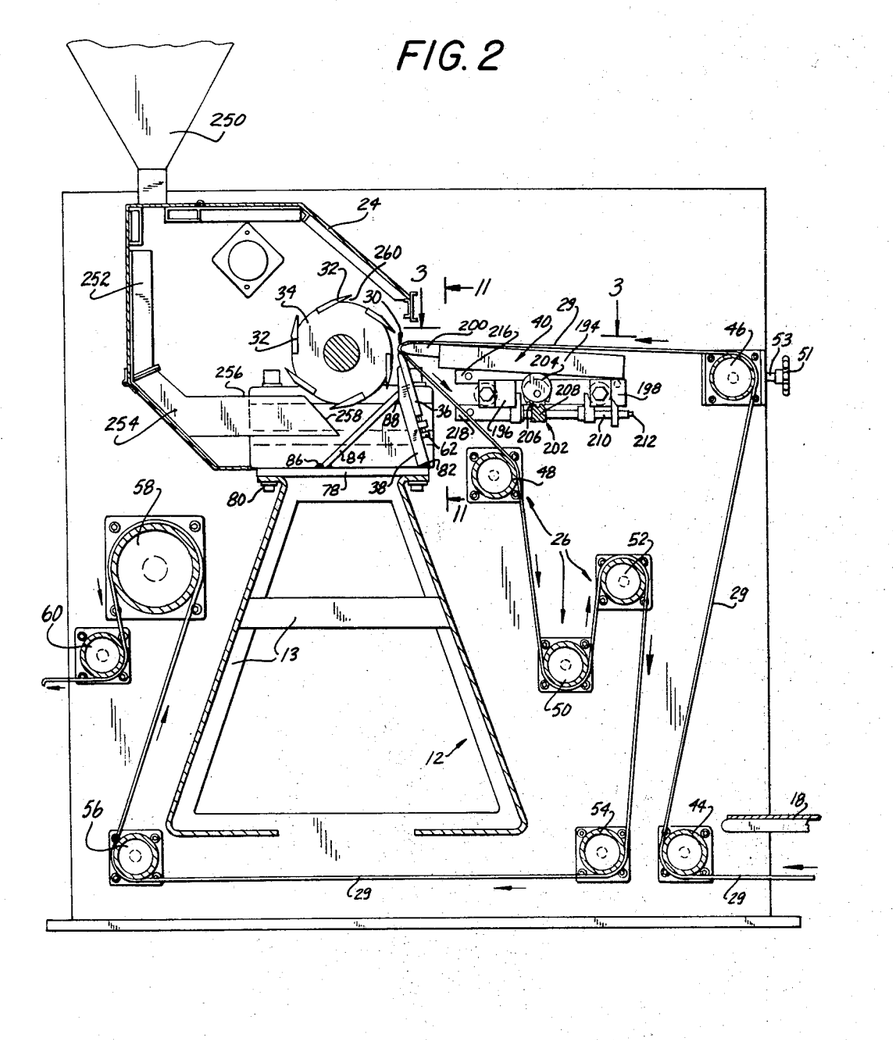
FIG. 2 is a cross-sectional view of the shearing apparatus taken on the line 2—2 of FIG. 1.
Figure 9:
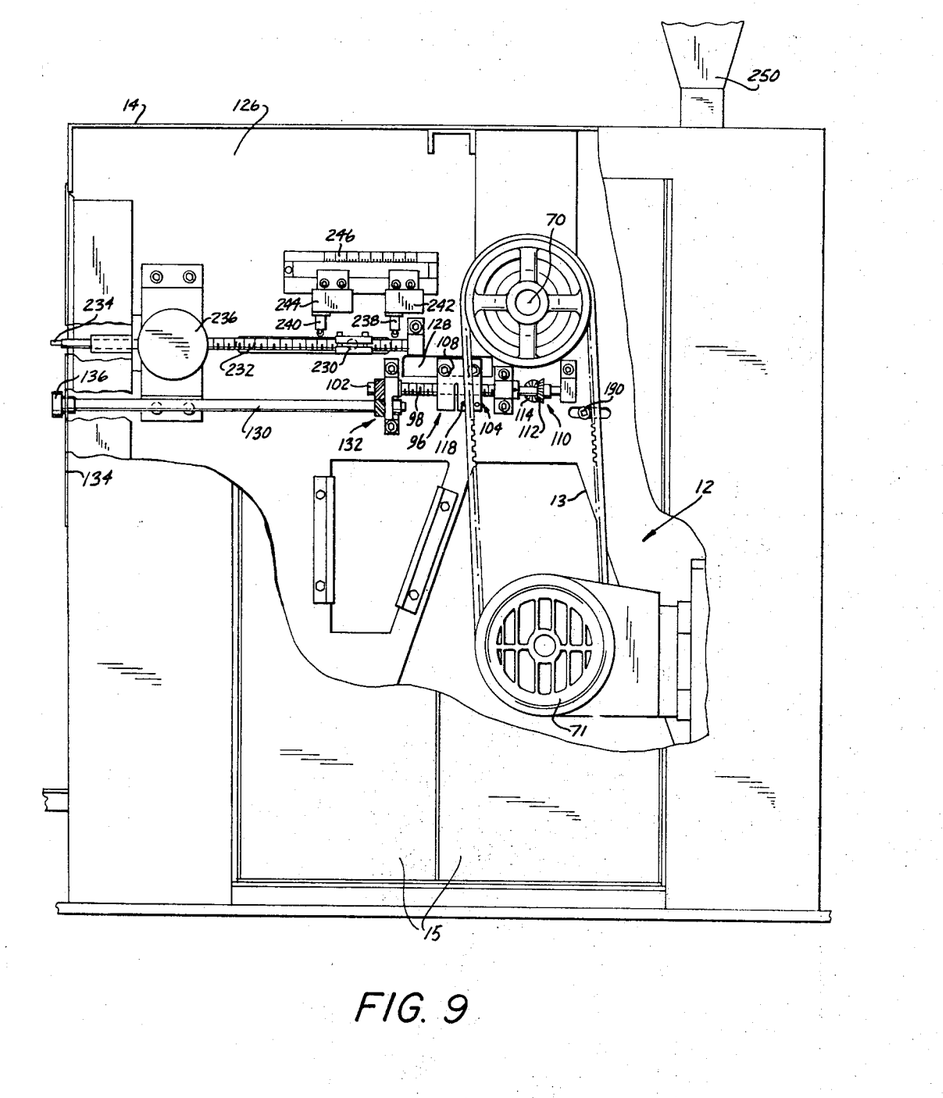
FIG. 9 is a side elevational view, in some respects modified from the other views, of the driving systems employed in the operation of the shearing apparatus as viewed from the right side of FIG. 1.

Referring to FIG. 1, a shearing apparatus typical of the invention is generally designated by the numeral 10. The apparatus 10 comprises a supporting means generally designated 12 which in cross-section comprises an "A" frame construction 13 as shown in FIG. 2. Support means 12 includes the right-side support frame 14 and the left side support frame 16. These support frames 14 and 16 are in the form of modular cabinets which house the driving mechanisms employed for the operation of the moving parts of the apparatus. These driving mechanisms are best shown in FIG. 9 within frame 14 and in FIG. 10 within frame 16, access thereto being obtained through doors 15 and 17, respectively.

A platform 18 which is equipped with a plurality of legs 20 positioned to support the platform on the floor is hingedly connected to the support means 12, and is capable of movement upwardly and inwardly in the direction of the arrow 22 of FIG. 1 toward the side frames 14 and 16. The platform may therefore be swung out of the way of the floor area when the apparatus is not in use and may be used to support an operator when the apparatus is in use. A hood 24 positioned above the apparatus 10 opposite the platform 18 is also capable of movement toward and away from the body of the apparatus. This hood is shown in the open position but would be closed during the operation of the apparatus for the safety of the operator as shown in FIG.

2. During that operation an oil mist generating unit 21 comprising a threaded shaft 23, a spray head 25 movable along shaft 23 and effective to spray oil onto cutting blades 32 of revolving cylinder 34, and a motor 27 (FIG. 10) effective to rotate shaft 23 also is in operation.

Figure 8:
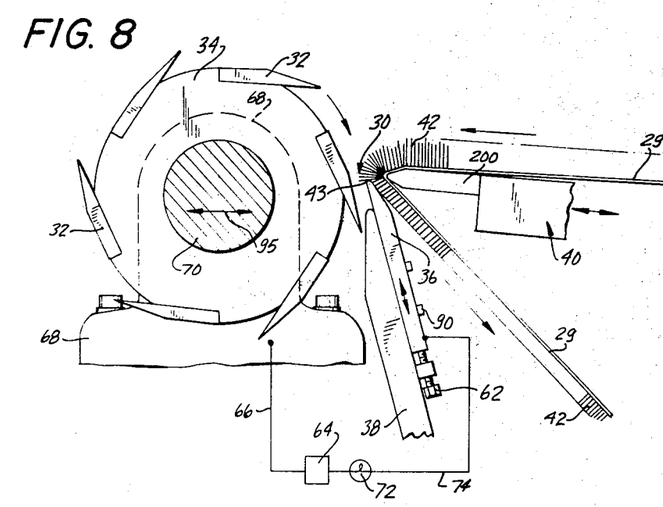
FIG. 8 is a schematic illustration of the shearing operation of the apparatus of FIG. 1, the sensing means also being schematically shown there.

A plurality of rollers generally designated by the numeral 26 in FIG. 1 are mounted by brackets 28 on the side frames 14 and 16, and extend substantially the entire distance between these frames. These rollers 26 are employed to guide and drive the fabric to be cut towards a shearing zone or cutting area, generally designated 30 and to carry the fabric out of the apparatus after shearing. That shearing zone 30 is established at the location here the cutting blades 32 on a revolving cylinder 34 come closest to a fixed cutting blade 36 which is mounted on a blade holder 38, as best shown in FIG. 8. A sheet fabric 29 is guided toward the zone 30 by the guide means 40 herein referred to as a feed table. The nose piece 200 of that feed table is effective to pass the pile fibers 42 on fabric 29 into the zOne 30 and to spread those fibers so that they reach the zone in an uncluttered condition and at a suitable cutting angle. As shown schematically in FIG. 8, the fibers 42 overlap the edge 43 of the fixed cutting blade 36, and are shearted by the action of the revolving blades 32 working against the fixed blade 36. The fabric 29 as it passes out of the shearing zone 30 is then characterized by a surface of pile fibers having a uniform length.

The path traversed by the fabric 29 during its travel into and out of the shearing apparatus 10 is best seen by referring to FIG. 2. As there illustrated the fabric 29 enters the apparatus below platform 18 and passes over roller 44. It then proceeds upwardly to roller 46 and from there substantially horizontally to the feed table 40. As explained with reference to FIG. 8, the fabric 29 passes over the nose piece 200 past the shearing zone 30 and then to roller 48. Fabric 29 then continues under roller 50 upwardly to roller 52, downwardly over roller 54 to roller 56 where it once again moves upwardly over the roller 58 and outwardly over the roller 60. The fabric then passes out of the machine and is collected by a suitable mechanism not shown but conventional.

Each of the rollers 44-60 performs a specific functon in moving the fabric 29. Roller 44, for example, is a free-turning idler roller having individual bearings at each end. This roller is used only as a guide to properly direct the entering fabric within the apparatus. Roller 46 is pivotally connected at one end to frame 16 at point 47 in FIG. 1, and is movably connected at its opposite end to the bracket 49 on the frame 14. A knob 51 is connected by means of a shaft 53 (FIG.2) to this roller and when rotated adjusts the horizontal position of that end of the roller carried in bracket 49. This roller 46, which is covered with rubber for increased traction, is not motivated by a driving mechanism. It may rotate freely or be controlled by a braking means. It is used to provide the proper tension on the fabric as it passes into the machine and it also controls fabric tracking.

Figure 10:
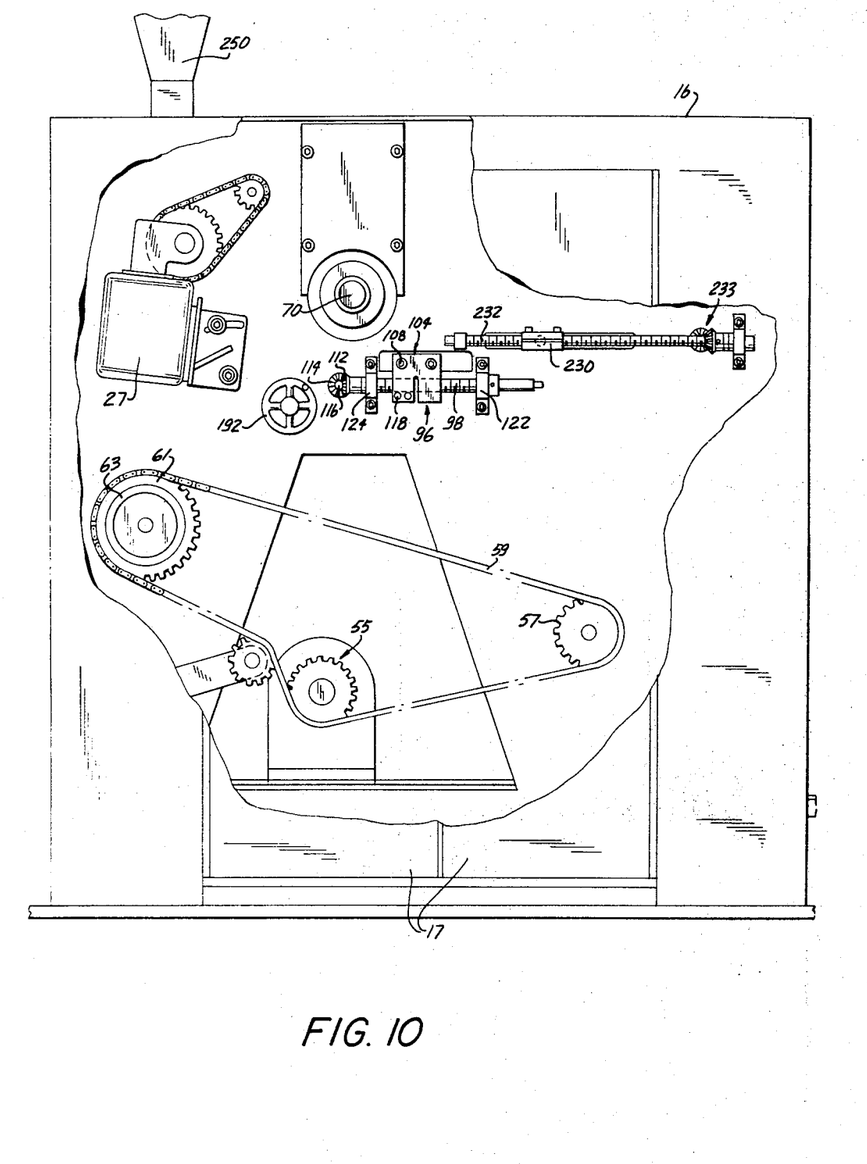
FIG. 10 is a side elevational view of the driving means for fabric feed, of the embodiment of FIG. 9 as viewed from the left side of FIG. 1.

Roller 48 is also a free-rolling used to guide the fabric toward the roller 50. The latter roller is driven by variable speed motor means 55 partially shown in FIG. 10. The roller 50 is connected to the motor 55 by a sprocket 57 and a chain 59 through a slip clutch. As shown in FIG. 10 a second sprocket 61 mounted on a slip clutch 63 is also connected to the motor 55 through the sprocket chain 59, and is of a larger diameter than sprocket wheel 57. Sprocket 61 is connected to roller 58, and due to the different sizes of sprocket wheels 57 and 61, roller 58 moves at a slightly faster rate of speed than does roller 50, thereby drawing the fabric out of the apparatus. The remaining rollers 52, 54, 56 and 60 are guide rollers which are freely rotatable in bearings connected by bearing brackets 28 to the side frames 14 and 16, as illustrated in FIG. 1.

The shearing apparatus and its operation as thus far described do not differ substantially from conventional systems. In all such systems the shearing zone 30, that is the clearance space between cutting blades 32 and 36, should be maintained at a minimum clearance level, that is equal to or less than 30 percent of the thickness of the fibers to be cut. In referring to FIG. 8, it will be appreciated that the clearance space may be varied by relative movement of the cylinder 34 on which the cutting blades 32 are mounted relative to the cutting blade 36. The cutting blade 36 may be elevated or lowered by releasing bolts 90 and turning the adjusting screws 62, but it is preferred that this adjustment be reserved for wear compensation of a more or less gross nature. The clearance adjustment is preferably accomplished by moving the cylinder 34 back and forth in the direction of the arrow 95 in FIG. 8, by means described below, this being much more feasible for in-operation adjustment. In either case, the present invention includes means for accurately measuring the clearance dimension during such movement, even when the apparatus is in operation, that is, when the cylinder 34 is rotating.

Figure 7:
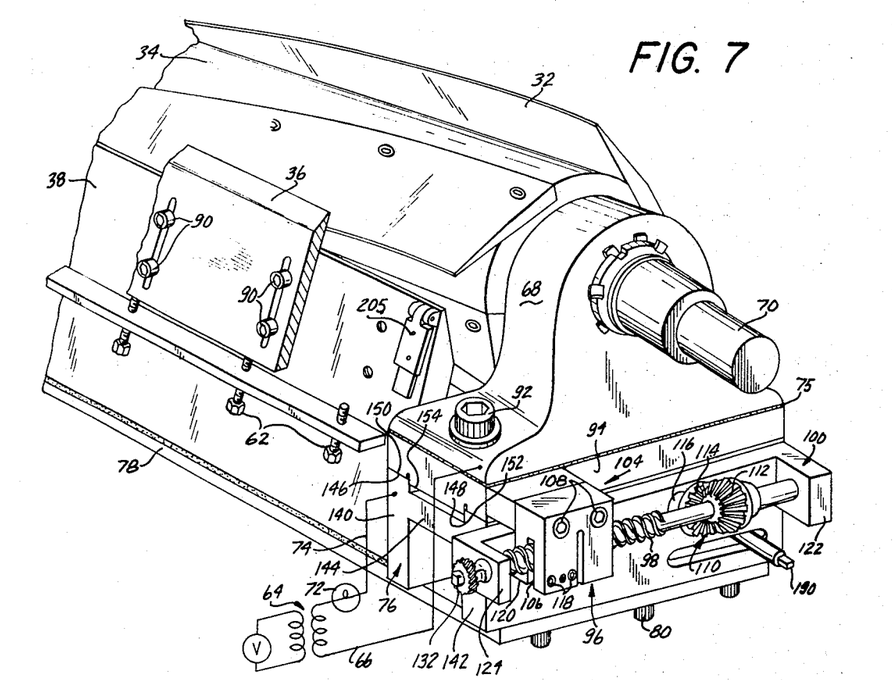
FIG. 7 is a fragmentary perspective view of a unitized structure which forms a part of the shearing apparatus of FIG. 1; together with a schematic representation of a sesning means effective to measure the clearance distance between cutting blades in the apparatus.

Such a measurement is very simply accomplished in the present invention by providing an electrical potential across the fixed cutting blade 36 and the movable cutting blades 32. FIGS. 7 and 8 schematically illustrate this arrangement. As there shown, a voltage source 64 which may produce a voltage of a small magnitude, for example on the order of six volts, is connected by wire 66 to an electrically conductive bearing block 68. The bearing block 68 contains a bearing for carrying the cylinder 34, and more specifically the cylinder shaft 70, and is electrically connected to the cutting blade 32 through the shaft 70 and the body of the cylinder 34. All of these members are composed of an electrically conductive material such as a suitable metal. Therefore one terminal of the voltage source 64 is electrically connected to the blades 32. The other terminal of the voltage source 64 is connected to an indicating means such as a light or meter 72. Electrical connection is made from the light to the fixed cutting blade 36 by the wire 74. In practice, such a connection may be made to a supporting block 76 as shown in FIG. 7. This block 76 is electrically conductive and is mounted on an electrically conductive base 78 to which the bedknife holder 38 and thus the bedknife 36 are also connected. Since these members are all electrically conductive, he voltage source 64 is connected to the fixed cutting blade 36. Blades 32 are insulated from blade 36 by insulation 75 which is positioned between bearing block 68 and support block 94. As a result, when the source 64 is energized, its output voltage is placed directly across the cutting blades and the means 72 is effective to indicate the level of current conduction between these blades. Since conduction between blades is directly dependent upon the size of the gap between blades, or stated differently, the magnitude of the dielectric between the blades, a good indication of the clearance space may be obtained by noting the current level in the means 72. Obviously, if the clearance space between blades is of the order of magnitude desired, a current will pass between the blades and register on the means 72. If, however, the gap is too large the means 72 will indicate no current flow or a current insufficient for the purposes of the proper operation of the machine. The means 72 may be constituted by an indicating instrument positioned on the front panel of frame 14 as shown in FIG. 1 for the convenience of the operator. Thus by the simple means described an indication of the gap between blades may be obtained while the machine is in operation, and due to improvement hereinafter further described, adjustment of the position of the several variable components also may be made whiel the machine is still running. Such an adjustment may be continuously monitored with the clearance measuring mechanism just described.

The subject apparatus is therefore capable of measuring the clearance space between cutting blades while one of these blades is rotated. If this clearance space is not a desired amount, then an adjustment of those parts which directly affect the size of the space, specifically the distance between the cylinder 34 and bedknife 36, must be made. It is more desirable to move the rotating blades 32 toward the fixed blade 36 since the fixed blade is at a prescribed angle and elevation which is predetermined and fixed to give the best shearing action. The apparatus of this invention provides a unique structural arrangement which is capable of enabling the cylinder 34 and the blades 32 attached thereto to move toward or away from the cutting zone 30 while the cylinder is rotating. This sturcture is best described with reference to FIGS. 2 and 7.

FIG. 7 illustrates the right-hand side of a unitized structure which contains the cutting blades 32 and 36 as well as other components. A base member 78 extends across substantially the entire width of the apparatus 10 and provides a support for the unitized structure here described. The base member 78 is connected by bolts 80 to the main "A" frame 13 of the apparatus as best shown in FIG. 2. When so attached to the main frame, the unitized structure illustrated in FIG. 7 is capable of resisting vibrational forces normally encountered during the operation of this apparatus, and thereby maintains the clearance space between cutting blades 32 and 36 when the apparatus is operating. In this structural arrangement, the blade holder 38 is welded to the base member 78 at the joint 82 shown in FIG. 2. A brace 84 is angularly positioned between the top portion of the holder 38 and the base 78. This brace 84 is welded at its ends 86 and 88 to the base 78 and the holder 38, respectively. Thus, the fixed blade 36 is rigidly held in position by the substantially triangularly shaped supporting arrangement provided by the blade holder 38, the base 78, and the brace member 84. The blade 36 is adjustably connected to the holder 38 by screws 62 as well as by the bolts 90, shown best in FIG. 8.

The rotating cylinder 34 is similarly rigidly held to the base 78 through a plurality of components. The cylinder shaft 70 which is powered by variable speed motor 71 (FIG. 9) is carried in the bearing 68, there being one such bearing at each end of the shaft. The bearings 68 are bolted by means such as the bolts 92 (right side of apparatus shown in FIG. 7) to a bearing support block 94. The bearing support block 94 is in turn supported by the "H" block 76, and is connected thereto by locking means hereinafter further described in greater detail with reference to FIGS. 11 - 13. The support block 94 is movable relative to the H block 76 in a direction which carries the cylinder 34 closer to or further away from the fixed blade 36, that is, in the direction of the arrow 95 (FIG. 8). The H block 76 remains fixed to the base 78 during this movement. Such movement moves the bearing 68 and therefore the cylinder shaft 70 and the cylinder 34 itself closer to the cutting blade 36 so as to reduce the clearance space between operating blades.

The mechanism for moving the cylinder is designated generally by the numeral 96 (FIG. 7). This mechanism 96 comprises a threaded shaft 98 which extends in the direction of movement of the cylinder 34 and which is carried at opposite ends by the yoke 100. A member 104 which is here shown as a block having an opening 106 encloses the threaded portion of the shaft 98 at the opening 106. The member 104 is attached to the bearing block 94 by means such as the screws 108. This block 104 is internally threaded so as to properly mate with the thread on the shaft 98. The block 104 will move relative to the threaded shaft 98 upon the rotation of the latter, and since it is fixed to the bearing block 94 the movement of the block 104 causes the bearing block 94 and thus the bearing 68 also to move. Similarly the cylinder 34 is caused to move by its connection to the bearing block 68. The threaded engagement of the shaft and the block 104 may be designed so that a single rotation of the shaft 98 causes a very minimal linear movement of the cylinder 34 toward the shearing zone 30. In this way very accurate control of the position of the cylinder may be readily obtained.

The opposite bearing 68 is simultaneously moved by the driving mechanism 96 through an identical shaft and threaded member arrangement connected to that bearing in an appropriate position as shown in FIG. 10. The driving linkage is through the miter gear arrangement shown generally at 110 (FIG. 7). Gear 112 is connected to the shaft 98 while gear 114 is connected to a transverse shaft 116 which extends the width of the apparatus and connects with a similar miter gear shaft on the other side of the apparatus identically numbered in FIG. 10.

The high degree of tracking accuracy in movement between the shaft 98 and the cylinder 34 is accomplished by the structure of the member 104. This member 104, which may be composed of a suitable material as oilite, is adapted to be adjusted so that the engagement pressure of its internal threads against the threads of the shaft 98 may be varied. Such adjustment is accomplished by manipulating the screws 118. These screws extend through the opening 106 into the opposite section 120 of the member 104. Rotation of these screws in a clockwise direction reduces the width of the opening 106. This necessarily increases the engagement pressure of the mating threads, and reduces backlash between the threads to substantially zero. As a result, any calculated ratio between the rotation of the shaft 98 and the linear motion of the cylinder 34 may be relied upon since there is virtually no lost motion in the connecting linkage between these parts.

The entire assembly illustrated in FIG. 7 may be mounted on the maino supporting means 12 of the apparatus 10 by connecting the end sections 122 and 124 of the yoke 100 at some suitable location on the farme of the apparatus. This connection is preferably a non-permanent one so that the entire unit illustrated in FIG. 7 may be removed from and assembled in the apparatus in the condition shown. As such, the unit represents a sub-assembly which is greatly advantageous to the manufacturer and the purchaser alike. The shaft 98 is connected at its end 102 to another shaft 130 by the connecting gears 132. The shaft 130 extends throug the front wall 134 of the frame section 14 and there terminates in an adjusting knob 136.

In the form specifically shown in FIGS. 9 and 10, which differs in some respects from that in other figures, the inside wall 126 of the frame section 14 is interposed between the driving mechanism 96 and the bearing block 94 (This is not shown in the embodiment of FIG. 7, for example.). A slot 128 is placed in the wall 126 and member 104 extends through the slot to its connecting point at the block 94. This modification is illustrated for the purposes of demonstrating other suitable embodiments of a structure equally successful in the operation of the device, but is somewhat less advantageous than the embodiment of FIG. 7, since disconnection of the unitized structure shown in FIG. 7 from the frame section 14 is not as quickly effected with the arrangement shown in FIGS. 9 and 10.

The linear movement of the cylinder 34 during the operation of the device is possible because of the unique structure centering primarily about the support blocks 76 and 94 and the locking mechanism employed to join these blocks together. This particular structure is more clearly illustrated in FIGS. 11 to 13. Referring to FIG. 1, for example, it will be seen that this structure of "H" block 76 and bearing supporting block 94 is positioned on both sides of the apparatus at each end of the cylinder 34. Reference, however, during the description of the detailed arrangement will be made to the structure on the right side only as viewed in FIG. 11.

Figure 11:
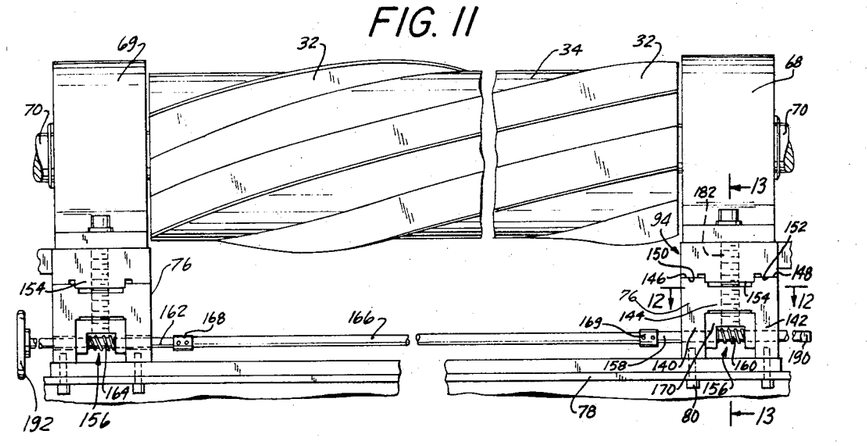
FIG. 11 is a front elevational view of the rotating cutting blades on a cylinder together with a support structure therefor which is adapted to permit linear movement of the cylinder.

Block 76 comprises two upstanding vertical walls 140 and 142 which are secured to the base plate 78, as by screws 80. A transverse wall 144 is positioned between the walls 140 and 142 and extends rearwardly substantially the entire length of the elongated H block. The transverse wall 144 is positioned below the upper surfaces 146 and 148 of the walls 140 and 142, respectively. These upper surfaces 146 and 148 receive the lower surfaces 150 and 152 of the bearing support block 94. This bearing support block 94 is provided with a downwardly projecting tongue section 154 which extends into the area between walls 140 and 142 and above the wall 144 of the H block 76. This tongue section 154 effectively provides a dovetail engagement between its side walls and the inner side walls of the upstanding walls 140 and 142. Lateral movement of the bearing support block 94, and therefore of the cylinder 34, is prevented by this engagement. The pressure of this engagement is sufficient to hold the cylinder in a stationary position relative to the H block 76 and base member even when the locking mechanism hereinafter further described is loosened, and it is free enough to permit a relative movement of the block 94 when a force is applied such as by the mechanism 96. When the locking mechanism is tightened and block 94 is made to bear heavily against the surfaces 146 and 148 of the H block 76, a very tight engagement of the tongue section 154 and the upstanding walls 140 and 142 is obtained, since the pressure of the bearing support block 94 on the walls 140 and 142 is sufficient to slightly deform these walls toward the tongue section 154. A plurality of locking points is thereby accomplished.

Figure 12:
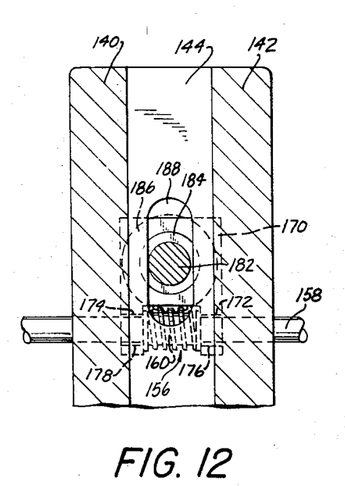
FIG. 12 is a cross-sectional view of the support structure at the right side of FIG. 11 as taken on the line 12—12 of FIG. 11.
Figure 13:
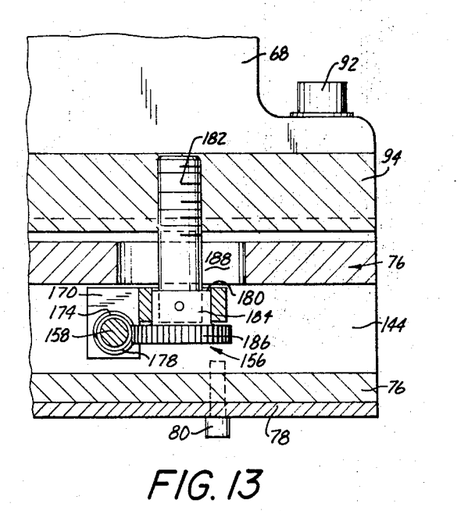
FIG. 13 is a fragmentary cross-sectional view of the same support structure of FIG. 12 taken on lne 13—13 of FIG. 11.

The locking mechanism which is employed to tighten the bearing blocks 94 against the H block 76 in the manner above described is designated generally by the numeral 156, and is clearly illustrated in FIGS. 11 to 13. Referring to these figures it will be seen that the locking mechanism 156 comprises a shaft 158 to which a worm 160 is attached. A similar shaft 162 and worm 164 is positioned on the opposite side of the apparatus as shown. Shafts 158 and 162 are interconnected by a coupling 166 which is pinned at points 168 and 169.

Referring again to the structure on the right-hand side of FIG. 11 as shown in FIGS. 12 and 13 it will be observed that the shaft 158 is carried by a yoke 170 and passes through openings 172 and 174. The shaft 158 is carried in bushings 176 and 178 in these openings, and is rotatable therein. The yoke 170 is provided with another opening 180 through which a threaded bolt 182 is passed. One end of the threaded bolt 182 is affixed to the bearing support block 94 and the other end is free-floating and is attached to a threaded collar 184 which is an integral part of the gear 186. The H block 76 is provided with a slot 188 through which the bolt 182 passes, the gear and collar being positioned below the H block 76. The gear 186 is in engagement with the worm 160 and is moved thereby upon the rotation of the shaft 158 or the shaft 162. Motion of these shafts may be affected from either side of the apparatus by turning, for example, the squared end section 190 of shaft 158 with a ratchet wrench or the like, or alternatively rotating the wheel 192 which is attached to the shaft 162 (FIG. 11). The squared section 190 and the wheel 192 are illustrated respectively in the interior part of frame sections 14 and 16, respectively, in FIGS. 9 and 10, and are readily accessible to the operator of the apparatus.

In the operation of the locking mechanism 156, rotary motion is transmitted to the worm 160 by application of a torque to the shaft 158. This motion is transmitted to the gear 186 and causes it to rotate. Since the collar 184 of the gear 186 is held against the yoke 170 which in turn is held against the lower surface of the H block 76, the effective result of this rotation is to draw down the bearing support block 94. The movement of this block 94 is in a direction which causes a tightening of engagement presssure at the surfaces 146 and 148 of the H block. When it is desired to loosen this connection rotation of the shaft 158 in the opposite direction will cause a reverse motion of the support block 94 and a subsequent loosening of the engagement pressure of that block and the H block. Thereafter, that block may be moved along the surfaces 146 and 148 by an actuation of the driving mechanism 96 (FIG. 7).

Thus, with the construction just described the position of the rotatable cutting blades 32 may be adjusted relative to the fixed blade 36 and such adjustment may be carried out while the cutting blades 32 are rotating. However, it is still highly desirable and in fact very important that the fibers to be sheared enter the shearing zone at an accurate position and angle relative to the cutting blades for a proper shear to be accomplished. Theoretically the best results occur when the fibers are positioned perpendicular to the two cutting blades and the cutting blades are positioned in registration with each other. Such fiber positioning is partly influenced by the guide means 40 which is schematically illustrated in FIG. 8 and is shown in greater detail in FIGS. 3 – 7.

In order to obtain the best position of fibers the guide means 40 is here provided with adjusting means which enables it to be moved upwardly and downwardly relative to the shearing zone 30, and inwardly and outwardly relative to that zone. The vertical movement of the guide means 40 is best described with reference to FIG. 5. In that figure the guide means 40 comprises an upper section 194 and a lower section 196. The section 194 is hingedly attached to the section 196 by hinge means 198 at the rear portion thereof. The forward portion of section 194 contains an extending nose piece 200 which, as illustrated in FIG. 8, is that member over which the fibers pass as they enter the shearing zone 30. This nose piece 200 is moved upward or downwardly by the motion of the upper section 194 relative to the lower section 196. Such motion is accomplished by the cam mechanism generally designated 202. This mechanism comprises eccentrically shaped cam 204, gear 206 and the worm gear 208, the latter being fixed to the shaft 210. The shaft 210 is accessible from the external part of the apparatus by its connection to the extended member 212 which can project beyond the front panel of the apparatus. Rotation of the shaft 210 such as by a force applied at the section 212 is effective to rotate the gear 208. This gear then imparts a rotary motion to the gear 206 and cam 204 to which it is connected. Upper section 194 is moved away from the lower section 196 in accordance with the position of the cam 204. In this manner the vertical height of the extended nose pice 200 may be accurately adjusted in accordance with the needs of the system. A scale 205 is mounted on the bedknife holder 38 (FIG. 7) and may be used when erected to measure the exact height of nose piece 200 relative to the center line of cylinder 34 and also to accurately set the height of the bedknife 36.

Figure 4:
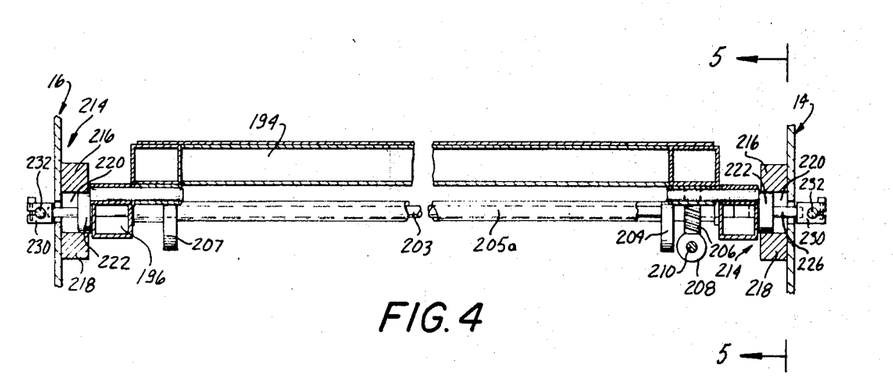
FIG. 4 is a cross-sectional view of the nose piece illustrated in FIG. 3, taken on the line 4—4 of FIG. 3.
Figure 5:
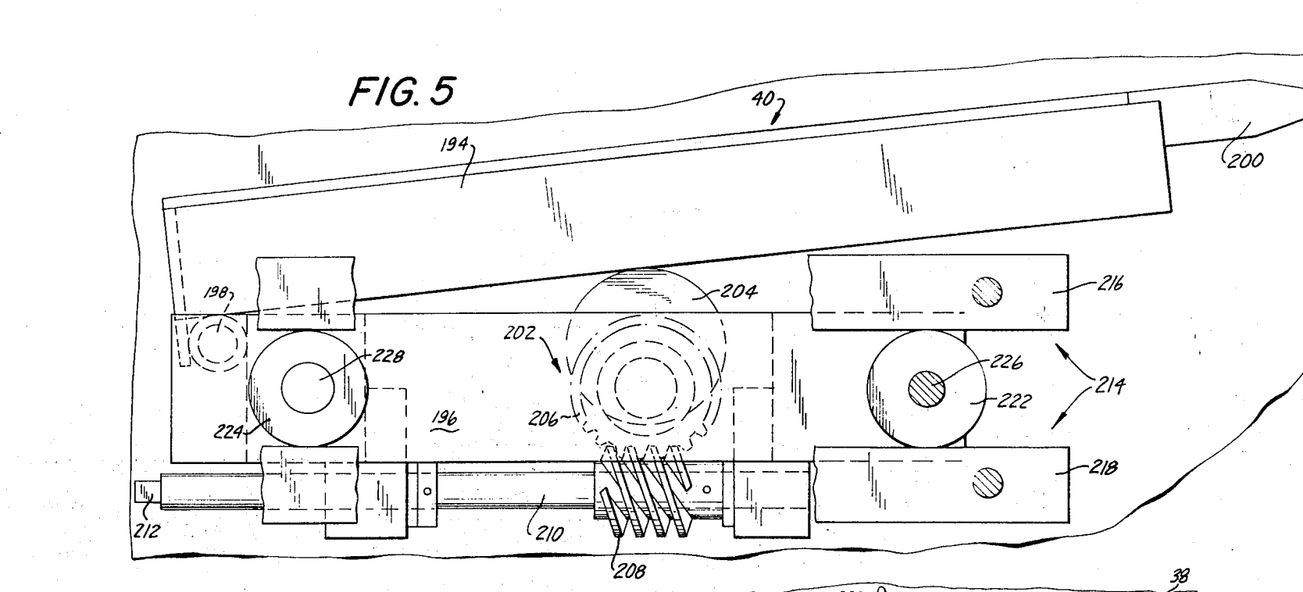
FIG. 5 is an enlarged side elevational view of the nose piece illustrated in FIGS. 3 and 4, taken on line 5—5 of FIG. 4.

As shown in FIG. 4 a similar cam 207 also eccentrically shaped is positioned on the left side of the nose piece 200, and is connected to a linking shaft 203 whichis covered by a sleeve 205 Rotation of the cam 204 on the right side of the apparatus is transmitted through the shaft 203 to the cam 207 on the left side. As a result both sides of the upper section 194 are simultaneously moved in a vertical direction in response to the single movement of shaft 210. Shaft 210 may be locked in a set position by clamping means (not shown).

Figure 3:
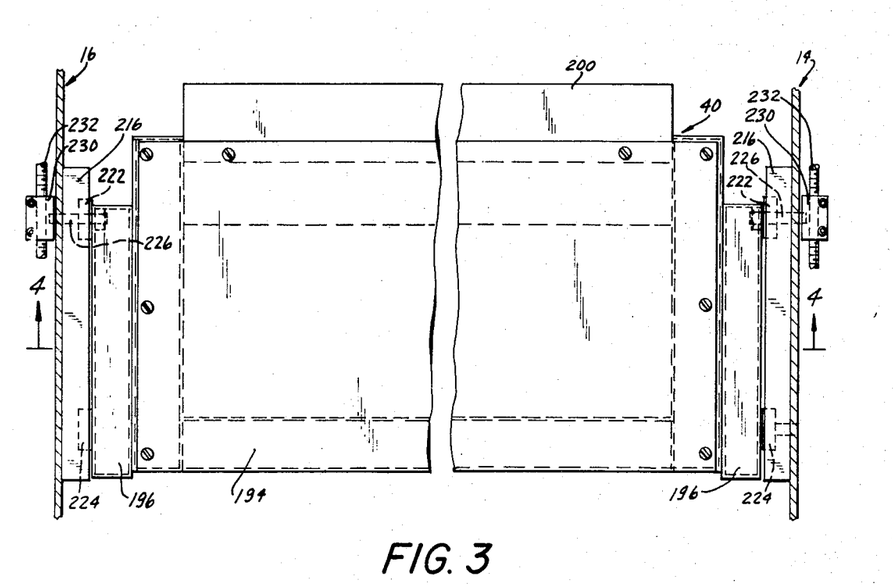
FIG. 3 is a top plan view of the nose piece illustrated in FIG. 2, taken on the line 3—3 of FIG. 2.
Figure 6:
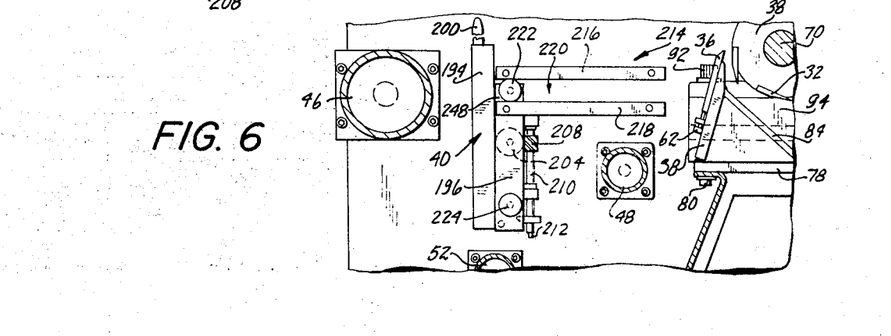
FIG. 6 is a fragmentary view to a reduced scale of the nose piece illustrated in FIGS. 3–5 in a fall away position on the frame of the apparatus of FIG. 1.

The horizontal movement of the guide means 40, that is in a direction toward or away from the shearing zone 30, is achieved by the structure illustrated best in FIGS. 3, 4 and 6. As there shown track means 214 are positioned on opposite sides of the apparatus against the frame sections 14 and 16. As most clearly illustrated in FIG. 6, the track means comprise an upper elongated rail 216 and a spaced lower elongated rail 218. These rails define a tracking area 220 therebetween into which the rollers 222 and 224 (FIG. 5) are placed. These rollers 222 and 224 are affixed to the lower part 196 of the guide means 40 by pins 226 and 228, respectively. Pin 226 extends into a block member 230 and is attached thereto at one end as shown in FIG. 3. Block 230 threadably engages a threaded shaft 232 and the shaft 232 extends outwardly to the front panel where it is accessible at its end section 234 as shown in FIG. 1. In a manner similar to that described with reference to FIG. 7, rotation of the threaded shaft 232 causes a linear movement of the block 230 along teh shaft. As a result, roller 222 is carried by its attachment through pin 226 along the tracking area 220 either toward the shearing zone or away from it in accordance with the direction of rotation of the shaft. Such rotary movement may be effected in part by a motor 236 which is shown in FIG. 9. The motor 236 is deactuated by the engagement of the block member 230 with the switch portions 238 and 240 of the limit switches 242 and 244 respectively. These limits switches may be spaced an accurate distance as measured by the scale 246 and the guide means 40 may be automatically moved by the motor 236 when travelling between limit switches. Movement beyond these limit switches in either direction can then be carried out by a manual force applied to the end section 234.

The position of limit switch 242 may be such as to automatically set the final position of nose piece 200.

The movement of block 230 along the shaft 232 during the travel of the guide means 40 along the tracking area 220 is transmitted to the left side of the apparatus to a similar block 230 which moves along a similar shaft 232. The driving movement is transmitted through a transverse shaft not shown but which may be connected between the threaded shafts 232 by miter gears 233 at each end thereof as illustrated in FIG. 10. With this construction equal force is generated on both sides of the nose piece permitting an even movement of the nose piece along oppositely positioned tracks on frames 14 and 16. As shown in FIG. 10, the driving mechanism on the left side of the nose piece is identical to that on the right side, and is similarly numbered to illustrate the corresponding parts. The use of a motor to drive the guide means 40 is to facilitate the quick removal of the nose piece from the general area of the shearing zone, if necessary and more specifically to aid in bringing it to the vertical position illustrated in FIG. 6. This position facilitates maintenance of the machine since the guide means 40, a rather bulky object, is moved out of the way thereby exposing the interior parts of the apparatus. The guide means 40 is capable of assuming the position shown in FIG. 6 because the track means 214 is provided with an opening 248 at its rear part through which the rollers 224 pass when the guide means 40 is moved back away from the shearing zone. The guide means 40 is pivoted on pin 226 at the front roller 222 and held in a vertical position by the member 230 which still tightly engages the threaded shaft 232 when the rear rollers 224 pass out of the opening 248. Return of the guide means 40 to its horizontal position in the track means 214 is easily accomplished simply by lifting the nose piece and rolling the front roller 222 along the tracking area 220 while lifting. Once the rear roller 224 is again in position in the track 220 a manual force can then be used to drive the nose piece forward until the motor 236 is again actuated.

The adjusting mechanisms just described are adapted to position the nose piece 200 of the guide means 40(and thus the fibers to be cut) in a variety of locations relative to the shearing zone, since movement in two planes is provided. Even further improvement of the fiber position is accomplished with the present shearing apparatus by a unique exhaust system which is illustrated best in FIG. 2. As there illustrated an exhaust system includes an exhaust stack 250 which is connected directly to a narrow exhaust pipe 252, a second exhaust pipe 254, and a third exhaust pipe 256 which extends to a position directly below the rotating cylinder 34. The pipe 256 is provided with an opening 258 which is adapted to receive the flock, that is, the sheared portion of the fibers which fall from the shearing zone 30. The opening 258 is positioned directly below the cylinder 34 and provides a high velocity scoop to receive the flock. Normally in conventional systems, the air turbulence generated by blades 32, specifically in the pocket areas such as designated by the numeral 260, causes the flock to swirl in a disoriented manne and to clog components in and around the shearing zone. Furthermore, this turbulence adversely affects the position of the fibers as they enter the zone. However, with the structure illustrated in FIG. 2, a negative pressure zone is created between the shearing blade 32 and the opening 258 in the pipe 256. Such a zone is formed in part by the brace 84. The air turbulence generated by the rotating blades is still present, but is now used to advantage to drive the flock into the opening 258 past the brace 84. The normally limp fibers are attracted by the negative pressure zone and are drawn to a position nearly horizontal as they enter the cutting zone 30. They are, therefore, properly positioned and an excellent shear results. Thus, the exhaust system depicted in FIG. 2 not only clears the flock with an extremely high efficiency, but also is effective to straighten the fibers to a desired extent.

To summarize, the shearing apparatus of the invention is provided with a number of features which function to improve to a great extent the shearing action of the apparatus. As a result, materials such as those used in garments which depend upon a fine and uniform finish for an attractive appearance are readily processed. Thus, synthetic fur coats and similar items are easily fabricated with materials processed in the shearing apparatus of the invention and are thereby provided with that lustrous, smooth finish so important in such garments.

The present apparatus provides a means to accurately measure the distance between cutting blades in the shearing zone while the machine is in operation. This specific distance or clearance space is extremely important to the proper shearing action of a device of this type. Its accurate control is obtained by a unique structural arrangement of the apparatus which includes a plurality of adjustment features all designed to enhance the operation of the system. For example, the rotating cylinder may be moved to a precise position relative to the fixed cutting blade by a mechanism characterized by a lack of lost motion in the transmission of driving force to the cylinder. A supporting structure which carries the cylinder includes uniquely configured support members which are adapted to adjust to the linear movement of the cylinder as well as to rigidly hold the cylinder against vibrational forces after the new position is obtained. Moreover, the guide table or nose piece customarily employed in an apparatus of this type is provided with mechanisms which enable it to be adjustably positioned in two planes relative to the cutting blades. This permits the fibers to be guided into the shearing zone at a precise angle to ensure the proper shearing of all of the fibers in the material to be cut. Finally, a novel exhaust system which is designated to remove the sheared segment of the fibers from the area of the cylinder and out of the apparatus cooperates with the remainder of the structure already present in the apparatus to further influence the orientation of the fibers as they enter the shearing zone.

It will be appreciated that many modifications of the apparatus described may be made. Purely by way of example, the measuring system which is used to monitor the clearance space between cutting blades may be of any electromagnetic system arrangement which is designed to produce an energy differential between blades. Moreover, any suitable type of measuring instrument in addition to the light or meter above described obviously may be used to accurately indicate the space between blades. Furthermore, other types of driving mechanisms may be used to move the several components of the apparatus. Mounting of the many components may be carried out in a manner different than that described in the drawings without adversely affecting in most instances the proper operation of the system. Additional components may also be added, such as an exhaust fan which may be suitably positioned above the material as it enters the shearing zone to further align the fibers prior to their entry into the zone.

While only one embodiment of the invention has been described, it will be appreciated that other embodiments and modifications may be provided, all within the scope of the appended claims.

I claim:

1. A shearing apparatus comprising support means and a unitized structure operatively connected to said support means and adapted to be removed and handled as a unit, said unitized structure comprising a base member operatively connected to said support means, first cutting means operatively connected to said base member, second cutting means operatively connected to said base member and positioned thereon in cutting relationship relative to said first cutting means, one of said cutting means being rotatable relative to the other of said cutting means during the operation of said shearing apparatus, means mounting said one of said cutting means for movement along said base member in a given direction toward and away from the other cutting means thereby to vary the clearance space between said cutting means, said mounting means comprising a supporting member supporting said one cutting means, track means on said base member mounting said supporting member for movement in said given direction and adapted to prevent lateral movement of said supporting member in the direction of the rotary axis of said one cutting means, means for moving said supporting member along said track means, adjustable locking means operatively connected between said track means and said supporting member and adpated to drive said supporting member toward said track means on said base to positively lock same against relative movement in said given direction, means accessible from the outside of said unitized structure for adjusting said locking means and means operatively connected to said first and second cutting means and effective to measure the clearance spaced therebetween while said one of said cutting means is rotating.

2. The shearing apparatus of claim 1, wherein said measuring means comprises a voltage source and means operatively connected to said voltage source and effective to apply a voltage across said first and second cutting means, said detecting means detecting the energy differential between said cutting means across said clearance space during the operation of said shearing apparatus.

3. In the apparatus of claim 1, said supporting member further comprising bearing means operatively connected to said one of said cutting means and effective to support said one of said cutting means during the rotation thereof, and a bearing support operatively connected to said bearing means and effective to movably mount said bearing means on said track means, said bearing means when moved being effective to carrying said one cutting means toward or away from said other cutting means, thereby reducing or increasing the clearance space between said first and second cutting means.

4. The shearing apparatus of claim 3, wherein said bearing means is electrically conductive and is operatively electrically connected to said one of said cutting means, means operatively electrically connecting opposite sides of said voltage source to said first and second cutting means, respectively, and insulating means between said bearing means and said bearing support and effective to electrically isolate said first and second cutting means.

* * * * *